(12) United States Patent
Vanthournout et al.

(10) Patent No.: US 9,506,670 B2
(45) Date of Patent: Nov. 29, 2016

(54) METHOD AND SYSTEM FOR BUFFERING THERMAL ENERGY AND THERMAL ENERGY BUFFER SYSTEM

(75) Inventors: Koen Vanthournout, Mol (BE); Johan Van Bael, Westerlo (BE); Bert Claessens, Spalbeek (BE); Reinhilde D'Hulst, Mol (BE)

(73) Assignee: VLAAMSE INSTELLING VOOR TECHNOLOGISCH ONDERZOEK (VITO), Mol (BE)

( * ) Notice: Subject to any disclaimer, the term of this patent is extended or adjusted under 35 U.S.C. 154(b) by 366 days.

(21) Appl. No.: 14/122,420

(22) PCT Filed: Jun. 4, 2012

(86) PCT No.: PCT/EP2012/060527
§ 371 (c)(1),
(2), (4) Date: Nov. 26, 2013

(87) PCT Pub. No.: WO2012/164102
PCT Pub. Date: Dec. 6, 2012

(65) Prior Publication Data
US 2014/0190680 A1    Jul. 10, 2014
US 2015/0153071 A2    Jun. 4, 2015

(30) Foreign Application Priority Data

Jun. 3, 2011    (EP) .................................... 11168672

(51) Int. Cl.
*F22B 35/00*    (2006.01)
*F24H 9/20*     (2006.01)
(Continued)

(52) U.S. Cl.
CPC ......... *F24H 9/2014* (2013.01); *F24D 19/1063* (2013.01); *F24H 9/2021* (2013.01);
(Continued)

(58) Field of Classification Search
CPC ....................................... F22B 35/00

USPC ........ 122/13.01, 209.1, 213, 448.1; 392/345, 392/447, 450, 454; 237/19, 8 R, 8 A; 700/275, 276
See application file for complete search history.

(56) References Cited

U.S. PATENT DOCUMENTS 7,628,122 B2 * 12/2009 Min ..................... F23N 5/006
                                                122/14.22
2005/0019631 A1  1/2005 Miyauchi et al.
(Continued)

FOREIGN PATENT DOCUMENTS

EP    2 146 309 A1    1/2010
JP    S58-173334 A    10/1983
(Continued)

OTHER PUBLICATIONS

Japanese Office Action dated Dec. 8, 2015, for JP 2014-513217, and English translation thereof.
(Continued)

*Primary Examiner* — Gregory A Wilson
(74) *Attorney, Agent, or Firm* — Bacon & Thomas, PLLC (57) ABSTRACT

A method for buffering thermal energy comprises a thermal buffering medium contained by a thermal energy buffer. The volume of the thermal buffering medium is subdivided in one or more parts such that the different parts of the volume of the thermal buffering medium together form the total thermal buffering medium. The thermal energy buffer comprises a temperature sensor for each part. A controller has at least one signal representing at least one thermal energy value related to the thermal energy buffer. The thermal energy values comprise a predetermined minimum amount of thermal energy present in the thermal energy buffer. The controller controls a heater such that the amount of thermal energy present in the thermal energy buffer is higher than or equals the predetermined minimum amount of energy present in the thermal energy buffer.

20 Claims, 5 Drawing Sheets

(51) Int. Cl.
*F24D 19/10* (2006.01)
*G01K 17/00* (2006.01)
*G01K 17/06* (2006.01)
*G05D 23/19* (2006.01)
*F28F 27/00* (2006.01)
*F28D 20/00* (2006.01)

(52) U.S. Cl.
CPC .......... *F28D20/0039* (2013.01); *F28F 27/00* (2013.01); *G01K 17/00* (2013.01); *G01K 17/06* (2013.01); *G05D 23/1923* (2013.01); *G05D 23/1931* (2013.01); *F24D 2240/26* (2013.01); *F28D 2020/0078* (2013.01); *Y02E 60/142* (2013.01)

(56) References Cited

U.S. PATENT DOCUMENTS

2010/0012740 A1   1/2010   Paulus et al.

2011/0162593 A1*  7/2011   Miura .................... F22B 35/00
                                                        122/448.1
2015/0204537 A1*  7/2015   Yamada ................ F22B 35/00
                                                        122/448.1

FOREIGN PATENT DOCUMENTS

| JP | S60-134140 A | 7/1985 |
| JP | 9-68369 A | 3/1997 |
| JP | 2004-218873 A | 8/2004 |
| JP | 2011-033246 A | 2/2011 |
| WO | 88/05160 A1 | 7/1988 |

OTHER PUBLICATIONS

European Office Action dated Apr. 28, 2015, for EP 12729056.7.
International Search Report in PCT/EP2012/060527, Jan. 3, 2013.

* cited by examiner

METHOD AND SYSTEM FOR BUFFERING THERMAL ENERGY AND THERMAL ENERGY BUFFER SYSTEM

BACKGROUND OF THE INVENTION

The current invention relates to a method for buffering thermal energy according to the preamble of the first claim.

The present invention also relates to a thermal energy buffer system for buffering thermal energy.

The present invention also relates to software for executing the method or for implementing the above system.

Methods for buffering thermal energy and thermal energy buffers are already known to the person skilled in the art. An example of a thermal energy buffer is for example a water heating unit of a domestic hot water system. Such a thermal energy buffer contains a thermal buffering medium, often water, contained in a tank and a controller controlling a heater of the thermal buffer. The heater can for example be an electrical heater provided at the bottom of the tank. In such water heating units, water often enters the tank at the bottom of the tank and exits the tank at the top. The controller is provided to receive a signal representing three signals representing thermal energy values related to the thermal energy buffer. These values purely represent temperatures and often are a minimum temperature, a maximum temperature and the temperature of the water in the tank measured by, for example, a sensor present in the tank at a certain location. When the temperature measured by the sensor drops below the minimum temperature, the controller activates the heater, for example until the maximum temperature is obtained. In such a configuration the minimum temperature represents the predetermined minimum amount of energy present in the thermal energy buffer.

However, such methods and corresponding water heating units can not be readily implemented in a so called smart-grid in which agents determine the functioning of the heater in function of energy price, amount of energy needed, flexibility of the energy consumption of the water heating unit, availability of renewable energy, etc.

Moreover, it has been found that when multiple water heating units of domestic hot water systems are for example controlled by a single controller using the thermal energy values provided by the different thermal energy buffers to the controller, the thermal energy values being expressed in, for example, degrees Celsius, controlling the water heating units in a consistent way such that the amount of energy of the different water heating units can be compared is not easy as the different thermal energy values are determined for different water heating units having different volumes for the tank, have different positions of the sensor sensing the temperature of the water in the waterheating unit, etc.

Although domestic water boilers of a complete population consume a great deal of energy and hence could contribute to maintaining stable network values if properly controlled, little progress has been made in coordinating the switching of these boilers other than to switch them on at night to make use of a night tariff. Any network connections at domestic premises are a potential security threat as they become easily accessible. It is not obvious how to improve this situation.

SUMMARY OF THE INVENTION

Therefore, it is an object of the current invention to provide an alternative method for buffering thermal energy and an alternative thermal energy buffer system. To achieve certain improvements embodiments of the present invention can provide one or more advantages:

at least one thermal energy buffer can be controlled more easily by a controller regardless of specific details of the thermal energy buffer, local controllers can be used which do not require access to wide area networks and their security threats while still providing more flexibility of local control of heating energy, in case of hierarchical market based control systems the demand bid curve can be controlled effectively by provision of a suitable control variable, in case of a time of use (ToU) demand response system such as based on variable day-ahead prices for multiple fixed time blocks per day, the scheduling of the energy buffer can be based on the cheapest allocation of a first parameter with a planning horizon proportional to a second parameter, and/or with Variable Connection Capacity in which real time limits are set on a household level for both consumption and production, the scheduling of the energy buffer can also be based on the cheapest allocation of a first parameter with a planning horizon proportional to a second parameter.

Such benefits can be achieved according to the method for buffering thermal energy according to the present description.

For example, the controller calculates one or more values representing amounts of thermal energy. According to preferred embodiments of the current invention, the thermal energy values comprise a minimal amount of heating energy representing the amount of energy ($E_{min}$) required to, using the heater, heat all the thermal buffering medium to a predetermined minimum temperature starting from the amount of thermal energy present in the thermal energy buffer. The predetermined minimum temperature is preferably the preferred minimum temperature at which water leaves the thermal energy buffer.

According to preferred embodiments of the current invention, the thermal energy values comprise a maximal amount of heating energy ($E_{max}$) representing the amount of energy required to, using the heater, heat all the thermal buffering medium to a predetermined maximum temperature starting from the amount of thermal energy present in the thermal energy buffer.

It has been found that such a minimal and/or maximal amount of heating energy allows the method or system to be employed together with other devices in a smart grid control system with an increased ease.

According to preferred embodiments of the current invention, the controller calculates the amount of thermal energy present in the thermal energy buffer by dividing the value representing the amount of thermal energy present in the thermal energy buffer with the value representing the maximum amount of thermal energy stored in the thermal energy buffer. The value is the State of Charge (SoC). In a specific embodiment, the controller calculates SOC, i.e. the amount of thermal energy present in the thermal energy buffer by dividing the value representing the amount of thermal energy present in the thermal energy buffer with the total volume of the thermal buffering medium multiplied with the difference between the predetermined minimum and maximum temperature.

Another such value is the total amount, of thermal energy present in the thermal energy buffer, said value being the sum of values each representing the thermal energy measured for a different part of the thermal buffering medium and each calculated by multiplying the temperature measured by the sensor of at least one part of the thermal buffering medium with the volume of the part of thermal buffering medium such as to obtain at least one value representing the partial thermal energy contained in the at least one part by the thermal buffering medium.

Such a calculated thermal energy value, next to taking into account the temperature of the volume of thermal buffering medium, such as for example water, also takes into account the volume itself of the thermal buffering medium such that a better representation of the energy content of the thermal buffering medium is obtained. Such an energy content can then be used to represent the thermal energy values and it has been found that, for example, thermal energy values represented in this way can be successfully used to control completely different thermal energy buffers with a single controller.

Moreover, it has been found that such a thermal energy buffer can be used in a smart grid control system such as for example the method described in the European patent application EP11162735.2.

Embodiments of the present invention can provide one or more advantageous technical solutions:
at least one thermal energy buffer can be controlled more easily by a controller regardless of specific details of the thermal energy buffer by using an interface that provides certain energy values that can be used for control purposes. These values can include any of, any combination of, or all of $E_{max}$, $E_{min}$, State of charge (SoC) and optionally for example $SoC_{min}$ which is the minimum SoC that must be maintained by any demand response control system to ensure that hot water is available to meet users' immediate demands and/or P, the electrical power consumption of the buffer;
local controllers can be used which do not require access to wide area networks and their security threats while still providing more flexibility of local control of heating energy, in case of hierarchical market based control systems the demand bid curve can be controlled effectively by provision of a suitable control variable such as a slope or priority inversely proportional to $SoC-SoC_{min}$, weighted proportional to $E_{min}$;
in case of a time of use (ToU) demand response system such as based on variable day-ahead prices for multiple fixed time blocks per day, the scheduling of the energy buffer can be based on the cheapest allocation of a first parameter such as $t_{max}$ with a planning horizon proportional to a second parameter such as $SoC-SoC_{min}$, and/or
with Variable Connection Capacity (VCC) in which real time limits are set on a household level for both consumption and production, the scheduling of the energy buffer can also be based on the cheapest allocation of a first parameter $t_{max}$ with a planning horizon proportional to a second parameter such as $SoC-SoC_{min}$, tmax is not explained. tmax is the time required to fully charge the buffer.

According to preferred embodiments of the current invention, the thermal energy buffer is a water heating unit of a domestic hot water system.

According to preferred embodiments of the current invention, the thermal buffering medium is water.

According to further preferred embodiments according to the current invention, the controller calculates the minimal amount of heating energy by multiplying the difference of the predetermined minimum temperature and the temperature measured by the one or more temperature sensors of the one or more parts containing thermal buffering medium having a temperature measured by their respective sensors which is lower than the predetermined minimum temperature with the respective volumes of the parts containing thermal buffering medium having a temperature measured by their respective sensors which is lower than the predetermined minimum temperature and adding the resulting values to each other.

According to further preferred embodiments of the current invention, the controller calculates the maximum amount of heating energy by at least multiplying the difference of the predetermined maximum temperature and the temperature measured by the one or more temperature sensors with the respective volume of the part corresponding to the temperature sensor and adding the resulting values to each other.

Such a calculated minimal and/or maximal thermal energy value, next to taking into account the temperature of the volume of thermal buffering medium, such as for example water, also takes into account the volume itself of the thermal buffering medium considered. Such an energy content can be easily used to represent the thermal energy values and it has been found that, for example, thermal energy values represented in this way can be successfully used to control completely different thermal energy buffers with a single controller. For example, it has been found that such a thermal energy buffer can be used in the method described in the European patent application EP11162735.2.

According to further preferred embodiments of the current invention the controller uses the temperature measured by the one or more temperature sensors with respect to the predetermined minimum temperature. Such an embodiment, especially in combination with the previous embodiment, allows to calculate the amount of thermal energy present in the thermal energy buffer relative to the maximum total amount of energy which can be present in the thermal energy buffer, defined by the multiplication of the predetermined maximum temperature and the total volume of the thermal buffering medium, and with respect to the predetermined minimum temperature.

According to preferred embodiments of the current invention, the controller further calculates the amount of thermal energy present in the thermal energy buffer by only using the parts containing thermal buffering medium having a temperature measured by their respective sensor which is higher than or equal to the predetermined minimum temperature. According to such embodiments, the amount of thermal energy present in the thermal energy buffer calculated by the controller for example range from 0 to 1, such that an indication of the state of charge of the thermal energy buffer can be provided by the controller which can be interpreted independently from other parameters and which therefore can be incorporated in smart grid network with increased ease. If required the indication of the state of charge can be represented as a percentage by multiplying it by 100.

According to preferred embodiments of the current invention, the one or more parts subdividing the volume of the thermal energy medium are provided on top of each other along an upright direction forming a stack of parts. Such a subdivision of the volume of the thermal buffering medium has been found to result in good representations of the amount of thermal energy present in the thermal energy buffer. Indeed, in such thermal buffers, such as for example water heating units of domestic hot water systems, a vertical distribution of temperatures of the thermal buffering medium is present, which can be relatively good approximated by such a stack of parts.

According to preferred embodiments of the current invention, the heater is positioned below the lowest temperature sensor. It has been found that such a positioning allows a better representation of the thermal energy present in the thermal energy buffer.

According to preferred embodiments of the current invention, wires interconnecting the different temperature sensors to the controller are guided to the outside of the thermal energy buffer at substantially the respective locations of the temperature sensors. Such an interconnection of the different wires interconnecting the temperature sensors to the controller prevents that temperature sensors near wires leaving the thermal energy buffer at the same location are unwontedly affected by a leakage of heat along these wires giving rise to an unwanted disturbance of the temperature measurement by the temperature sensor, as is for example the case when the different wires coming from the different temperature sensors are assembled within the thermal energy buffer and leave the thermal energy buffer at substantially that same location, the different wires, often being made of material having good thermal conducting properties, in such a case forming a heat or cold bridge to the outside having an increased risk for heat leaving the thermal energy buffer along it.

The invention also relates to a thermal energy buffer system provided for performing the method according to the invention, comprising a thermal energy buffer and a controller according to any of the claims 17 to 24 or 39 to 49.

The present invention also provides a computer program product having code segments which when executed on a processing engine execute any of the methods according to the present invention or implements the system in accordance with any of the embodiments of the present invention.

The present invention also provides a non-transient signal storage medium for storing the computer program product. The storage medium can be for example an optical disk such as a CD-Rom or DVD-ROM, a magnetic tape, a magnetic disk, a solid state memory etc.

The present invention also provides a controller for buffering thermal energy of a thermal energy buffer, the controller being adapted to perform a method according to the present invention or implement a system in accordance with the present invention. The controller can be implemented as a microcontroller and may include a processor such as a microprocessor or an FPGA and one or more memories. The processor can be adapted to execute any of the software of the present invention.

In the following detailed description, numerous specific details are set forth in order to provide a thorough understanding of the invention and how it may be practiced in particular embodiments. However, it will be understood that the present invention may be practiced without these specific details. In other instances, well-known methods, procedures and techniques have not been described in detail, so as not to obscure the present invention.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the invention.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

The term "comprising", used in the present description, should not be interpreted as being restricted to the means listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B.

DETAILED DESCRIPTION OF THE INVENTION

The thermal energy system 1 is provided for performing the method according to the invention and thereto comprises a thermal energy buffer 10 and a controller 3 provided to perform the method according to the invention.

Figure 1:
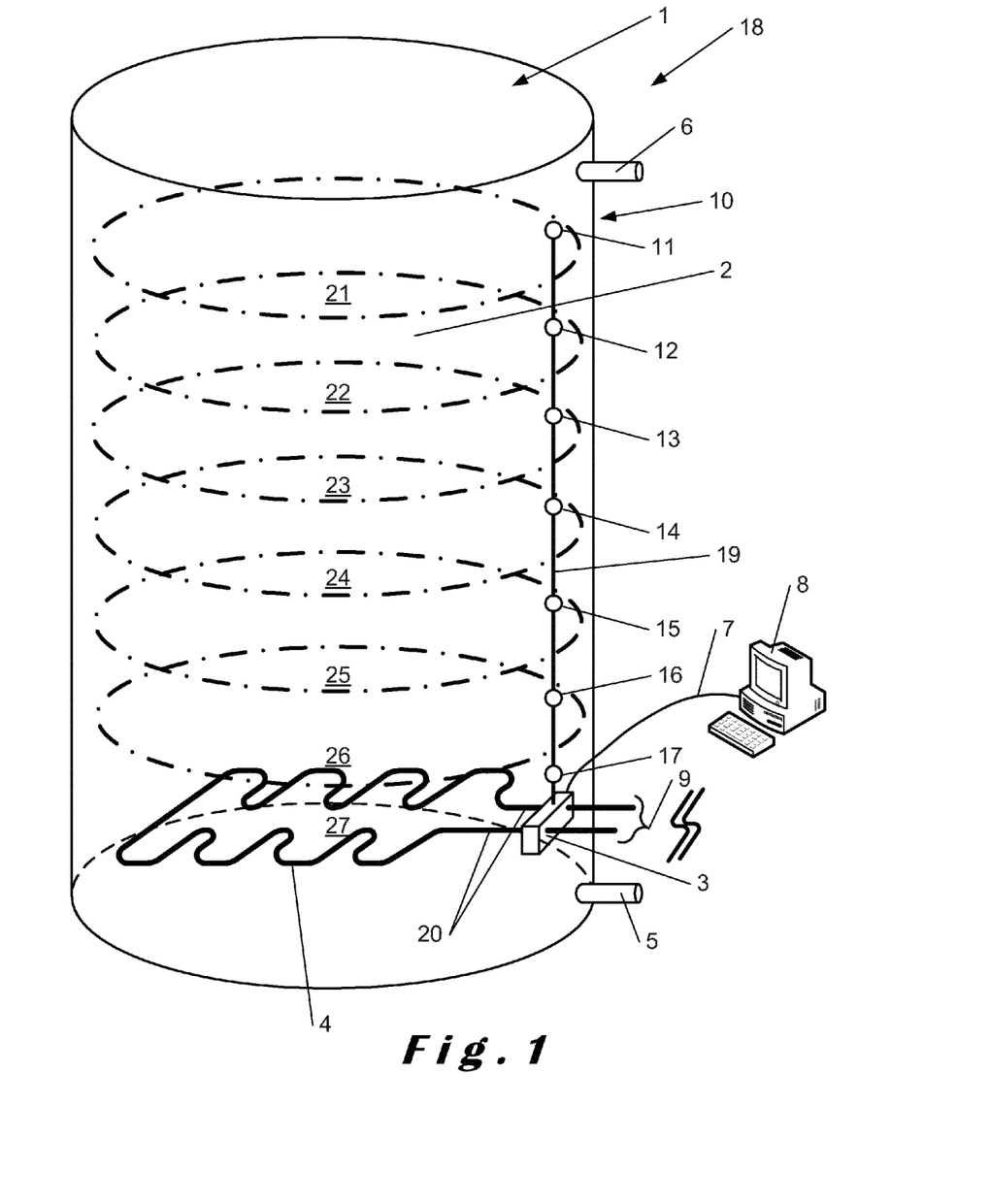
FIG. 1 shows an overview of a thermal energy buffer system according to the invention.

FIG. 1 shows that the thermal energy buffer 10 and the controller 3 are incorporated in a single device, in this case a domestic system, more specifically a domestic hot water system, even more specific a water heating unit 18 of a domestic hot water system. Such a configuration for example allows to replace an older water heating unit by a new water heating unit 18 with a controller without having to adapt the contacts with, for example, the power grid, etc. This is however not critical for the invention and the controller 3 and the thermal energy buffer 10 can also be physically different devices, for example when several thermal energy buffers 10 are connected to a single controller 3, allowing reduction of the number of controllers 3 necessary.

The thermal energy buffer 10 contains thermal buffering medium 2 which preferably is a liquid thermal buffering medium. The thermal buffering medium 2 can be any medium known to the person skilled in the art which allows to store thermal energy in it, but preferably is water as water is known to have good thermal storage properties, is safe and is widely available. Moreover, but not limited thereto, in such case the thermal energy buffer can also be used to provide a household with warm water making it a water heating unit 18 of a domestic hot water system. This is however not critical for the invention and the thermal energy buffer 10 can also be used in combination with a heat pump such that heat recovered by the heat pump can be temporarily stored in the thermal energy buffer 10.

Other buffering media are however also possible, such as for example gels having good thermal storage properties.

The controller 3 is provided to control a heater 4 of the thermal buffer 10. The heater 4 shown in FIG. 1 is an electric heater and is situated at the bottom of a tank inside the thermal energy buffer 10. Such a configuration is however not critical for the invention. It is for example possible to provide a heater 4 which is not electric but which, for example, uses gas, petrol, diesel fuel, etc. Also, the position of the heater 4 is not critical for the invention and can be at the bottom, near the middle, near the top, etc. However, by providing the heater 4 near the bottom it has been found that natural heat convection of the thermal buffering medium 2 when heated by the heater 4 allows that the thermal buffering medium 2 is heated homogeneously, as depicted for example in FIG. 2a which will be explained in more detail below.

The thermal energy buffer 10 shown in FIG. 1 comprises an inlet 5 and an outlet 6. The inlet 5 is positioned such that the thermal buffering medium 2 enters the thermal energy buffer at the bottom and the outlet 6 is positioned such that the thermal buffering medium 2 exits the thermal energy buffer 10 at the top. This has as a consequence that heated thermal buffering medium 2, which rises to the top due to convection, becomes near to the outlet 6. As the heater 4 preferably is located near the bottom, cold thermal buffering medium 2 entering near the bottom through the inlet 5, is heated by the heater 4 and afterwards rises to the top where the outlet 6 is located. Such a configuration has been found to further improve the homogeneous heating of the thermal buffering medium 2.

The exact configuration of the inlet 5 and the outlet 6 is not critical for the invention. Although they are shown here as pipes entering and leaving the thermal energy buffer 10 at the bottom and the top respectively, this is not critical for the invention. For example the inlet pipe 5 could for example enter the thermal energy buffer at the top of the thermal energy buffer going down through the thermal energy buffer 10 such that the thermal buffering medium 2 exits the inlet 5 near the bottom of the thermal energy buffer 10.

Preferably, the inlet 5 and the outlet 6 are configured such that the thermal energy buffer 10, preferably the tank provided in it, is substantially always, preferably always, filled with thermal buffering medium. Preferably this is obtained by configuring the inlet 5 and the outlet 6 such that when thermal buffering medium 2 is drawn from the thermal energy buffer 10 through the outlet 6, new thermal buffering medium 2 is led into the thermal energy buffer through the inlet 5 until the thermal energy buffer 2 is, preferably its tank, is filled again with thermal buffering medium 2 such that the tank remains substantially filled, preferably filled.

The volume of the thermal buffering medium 2, and accordingly the tank of the thermal energy buffer in which it is contained, is subdivided in at least one part 21 and suitably in a number of parts 21, 22, 23, 24, 25, 26, 27. Preferably, at least two parts are provided, more preferably even more such as for example at least three, four, five, six, seven eight, etc. The number of parts is not limited and can be determined by the person skilled in the art. As can be seen in FIG. 1, the parts 21, 22, 23, 24, 25, 26, 27 subdividing the volume of the thermal energy medium are provided on top of each other along an upright direction forming a stack of parts 21, 22, 23, 24, 25, 26, 27.

As can be seen in FIG. 1, the different parts 21, 22, 23, 24, 25, 26, 27 of the volume of the thermal buffering medium 2 together form the total thermal buffering medium 2 present in the thermal energy buffer 10 and the thermal energy buffer 10 comprises a number of respective one or more temperature sensors 11, 12, 13, 14, 15, 16, 17 for each part 21, 22, 23, 24, 25, 26, 27 for sensing a temperature of the thermal buffering medium 2 contained in the corresponding part 21, 22, 23, 24, 25, 26, 27. In combination with the preferred stack of parts 21, 22, 23, 24, 25, 26, 27, it has been found that such a configuration allows an improved way of sensing the temperature profile of the thermal buffering medium 2 as the temperature varies substantially only in height direction. As for the parts, the number of temperature sensors is not limited and can be determined by the person skilled in the art.

Although the parts 21, 22, 23, 24, 25, 26, 27 are indicated as such in FIG. 1, it is to be understood that the parts 21, 22, 23, 24, 25, 26, 27 only imaginarily subdivide the volume of thermal buffering medium 2 and not physically.

Preferably, the sensors 11, 12, 13, 14, 15, 16, 17 are placed along the thermal energy buffer 10 such that the position of each of these sensors corresponds to the position of each of the corresponding parts 21, 22, 23, 24, 25, 26, 27 subdividing the total volume of the thermal buffering medium 2. Thereto, preferably the temperature sensors are equidistantially distributed along the height of the thermal energy buffer 10, or along the height of the tank 18 comprised by the thermal energy buffer 10 and containing the thermal buffering medium 2.

The controller 3 is provided with at least one signal representing at least one thermal value related to the thermal energy buffer, wherein the at least one thermal energy value comprises a predetermined minimum amount of energy present in the thermal energy buffer and an amount of thermal energy present in the thermal energy buffer.

The controller 3 for buffering thermal energy of a thermal energy buffer is adapted to perform a method according to the present invention or implement a system in accordance with the present invention. The controller can be implemented as a microcontroller and may include a processor such as a microprocessor or an FPGA and one or more memories. The processor can be adapted to execute any of the software of the present invention.

The predetermined minimum amount of energy preferably can be set by a user through an interface which is connected to the controller. The interface can for example be provided on the thermal energy buffer 10 in the form of a screen, possibly with buttons added to the screen, reflecting information of the thermal energy buffer 10. This is however not critical for the invention and the interface can also be a computer 8 which is connected to the controller 3, over for example a computer network 7. The computer network 7 can for example be a LAN or the internet and can be a physical wire or, for example, wireless network such as for example WIFI. The controller 3, for example, is provided with a server application, for example a web server application, allowing the computer 8 to log in to the website to set, for example, the predetermined values of the thermal energy values.

The controller 3 is provided to calculate a value representing the amount of total thermal energy present in the thermal energy buffer by multiplying the temperature measured by each sensor 11, 12, 13, 14, 15, 16, or 17 corresponding to respectively part 21, 22, 23, 24, 25, 26, 27 of the thermal buffering medium 2 with the volume of the corresponding part of thermal buffering medium 2 such as to obtain a value representing the partial thermal energy contained in the corresponding part of the thermal buffering medium 2 and adding the resulting partial thermal energy values to each other.

The controller 3 shown in FIG. 1 directly interconnects the heater 4 to the power grid through power lines 19, 20. This is however not critical for the invention and the controller 3 could also control a separate switch connecting/disconnecting the heater 4 to the power grid. Naturally, instead of a power grid, depending on the type of heater 4, a different power source of heat can be used such as for example diesel fuel, gas, etc.

Preferably, the controller 3 further calculates the amount of thermal energy present in the thermal energy buffer 10 by only using the parts 21, 22, 23, 24, 25, 26, 27 containing thermal buffering medium 2 having a temperature measured by their respective sensor which is higher than or equal to a predetermined minimum temperature, which may be part of the thermal energy values. For example, when new thermal buffering medium 2 has entered the thermal energy buffer 10 at the bottom of the thermal energy buffer 10, the temperature sensors at the bottom will record a temperature which may be lower than the predetermined minimum temperature such that these parts are not taken into account when calculating the thermal energy present in the thermal energy buffer 10.

Preferably, the controller 3 uses the temperature measured by the temperature sensors 11, 12, 13, 14, 15, 16, 17 with respect to the predetermined minimum temperature. This is preferably done by a subtraction of the measured temperature with the predetermined minimum temperature.

Preferably, the thermal energy values also comprise a predetermined maximum temperature, which preferably can be set by a user according to his preferences, such as for example the desired level of comfort. Preferably, the predetermined maximum temperature is determined such that the thermal buffering medium, which preferably liquid or semi-liquid, does not start boiling as in such case the pressure inside the preferred tank of the thermal energy buffer would start to rise such that the risk that explosions occur would increase.

Preferably, the controller 3 further calculates the amount of thermal energy present in the thermal energy buffer 10 by dividing the value representing the amount of thermal energy present in the thermal energy buffer with the value representing the maximum amount of thermal energy stored in the thermal energy buffer. The value is the State of Charge (SoC). In a specific embodiment, the controller calculates SoC, i.e. In a specific embodiment, the controller calculates SOC, i.e. the amount of thermal energy present in the thermal energy buffer by dividing the value representing the amount of thermal energy present in the thermal energy buffer with the total volume of the thermal buffering medium 2 multiplied with the difference between the predetermined minimum and maximum temperature.

Preferably, the thermal energy values comprise a minimal amount of heating energy representing the amount of energy required to heat all the thermal buffering medium 2 to a predetermined minimum temperature, using the heater 4, starting from the amount of thermal energy present in the thermal energy buffer 10.

More preferably, the controller 3 calculates the minimal amount of heating energy by multiplying the difference of the predetermined minimum temperature and the temperature measured by the temperature sensors sensing the temperature of the parts 21, 22, 23, 24, 25, 26, 27 containing thermal buffering medium having a temperature measured by their respective sensors 11, 12, 13, 14, 15, 16, 17 which is lower than the predetermined minimum temperature within the respective volumes of the parts 21, 22, 23, 24, 25, 26, 27 containing thermal buffering medium 2 having a temperature measured by their respective sensors 11, 12, 13, 14, 15, 16, 17 which is lower than the predetermined minimum temperature and adding the resulting values to each other. This is for example mathematically represented as, where the thermal buffering medium is water having a heat capacity of 4186 J/(kg K):

$$E_{min} = \forall\, j(j: 0 \to n,\, T_j < T_{min}) \to \sum_j \left[\frac{4.186 V_j (T_{min} - T_j)}{3600}\right]$$

wherein:
$T_{min}$ is a predefined minimum temperature
n is the number of parts 21, 22, 23, 24, 25, 26, 27+1
$T_j$ is the temperature measured by the respective temperature sensors 11, 12, 13, 14, 15, 16, 17
$V_j$ is the volume of the respective parts 21, 22, 23, 24, 25, 26, 27

Preferably, the thermal energy values comprise a maximal amount of heating energy representing the amount of energy required to, using the heater, heat all the thermal buffering medium to a maximum temperature starting from the amount of thermal energy present in the thermal energy buffer.

More preferably, the controller 3 calculates the maximal amount of heating energy by at least multiplying the difference of the predetermined maximum temperature and the temperature measured by the at least one temperature sensor 11, 12, 13, 14, 15, 16, 17 with the respective volume of the part 21, 22, 23, 24, 25, 26, 27 corresponding to the temperature sensor 11, 12, 13, 14, 15, 16, 17 and adding the resulting values to each other. This is for example mathematically represented as, where the thermal buffering medium is water having a heat capacity of 4186 J/(kg K):

$$E_{max} = \sum_{i=0}^{n} \left[\frac{4.186 V_i (T_{max} - T_i)}{3600}\right]$$

wherein in addition to above:
$T_{max}$ is a predefined maximum temperature
n is the number of parts 21, 22, 23, 24, 25, 26, 27+1
$T_i$ is the temperature measured by the respective temperature sensors 11, 12, 13, 14, 15, 16, 17
$V_i$ is the volume of the respective parts 21, 22, 23, 24, 25, 26, 27

The preferred way of calculating the amount of thermal energy present in the thermal energy buffer in such case can be mathematically represented by:

$$SoC = \forall\, i(i: 0 \to),\, \forall\, j(j: 0 \to n,\, T_j \geq T_{min}) \to 100 \left[\frac{\sum_j V_j (T_j - T_{min})}{\sum_i V_i (T_{max} - T_{min})}\right]$$

wherein:
$T_{min}$ is a predefined minimum temperature
$T_{max}$ is a predefined maximum temperature
n is the number of parts 21, 22, 23, 24, 25, 26, 27+1

$T_j$ is the temperature measured by the respective temperature sensors 11, 12, 13, 14, 15, 16, 17

$V_j$ or $V_j$ is the volume of the respective parts 21, 22, 23, 24, 25, 26, 27

SoC represents the state of charge, representing the amount of energy present in the thermal energy buffer as a percentage with respect to the maximum amount of energy present in the thermal energy buffer with respect to the minimal amount of heating energy.

Although in the shown formula, the state of charge is calculated as a percentage, this is not critical for the invention and the state of charge can also be calculated as a value between 0 and 1 by leaving out the multiplication by 100. Optionally for example the $SoC_{min}$ can be calculated and used as a control variable. $SoC_{min}$ is the minimum SoC that must be maintained by any demand response control system to ensure that hot water is available to meet users' immediate demands.

Although the controller 3 can be provided to calculate the state of charge as described above the state of charge can also be calculated by the controller 3 by the following mathematical formula:

$$SoC = 100 \left[ 1 - \frac{3600(E_{max} - E_{min})}{4.186(T_{max} - T_{min})V_t} \right]$$

wherein $V_t$ represents the total volume of the thermal buffering medium and the other symbols are defined as described above.

Of course, the other way around it is possible to calculate the state of charge using the earlier method and to calculate $E_{max}$ and $E_{min}$ using either one of the following mathematical formula:

$$E_{max} = E_{min} + \frac{4.186}{3600}(T_{max} - T_{min})\left(1 - \frac{SoC}{100}\right)V_t$$

$$E_{min} = E_{max} - \frac{4.186}{3600}(T_{max} - T_{min})\left(1 - \frac{SoC}{100}\right)V_t$$

Using these thermal energy values, the predetermined energy values, which can be set by a user according to his preferences, such as for example corresponding to a "comfort" status, for example are 35° C.-50° C., preferably 40° C., for $T_{min}$, 60° C.-90° C., preferably 70° C., for $T_{max}$, 5%-50%, preferably 20%, for the predetermined minimum amount of energy present in the thermal energy buffer.

The controller 3 is provided to control a heater 4 of the thermal buffer 10 in function of the thermal energy values such that the amount of thermal energy present in the thermal energy buffer 10 is higher than or equals the predetermined minimum amount of energy present in the thermal energy buffer 10.

Preferably, wires 19 interconnecting the different temperature sensors 11, 12, 13, 14, 15, 16, 17 to the controller are guided to the outside of the thermal energy buffer 10 at substantially the respective locations of the temperature sensors 11, 12, 13, 14, 15, 16, 17 and are subsequently connected to the controller 3, which is schematically shown in FIG. 1.

Preferably, the heater 4 is positioned below the lowest temperature sensor 17 as shown in FIG. 1.

Figure 2A:
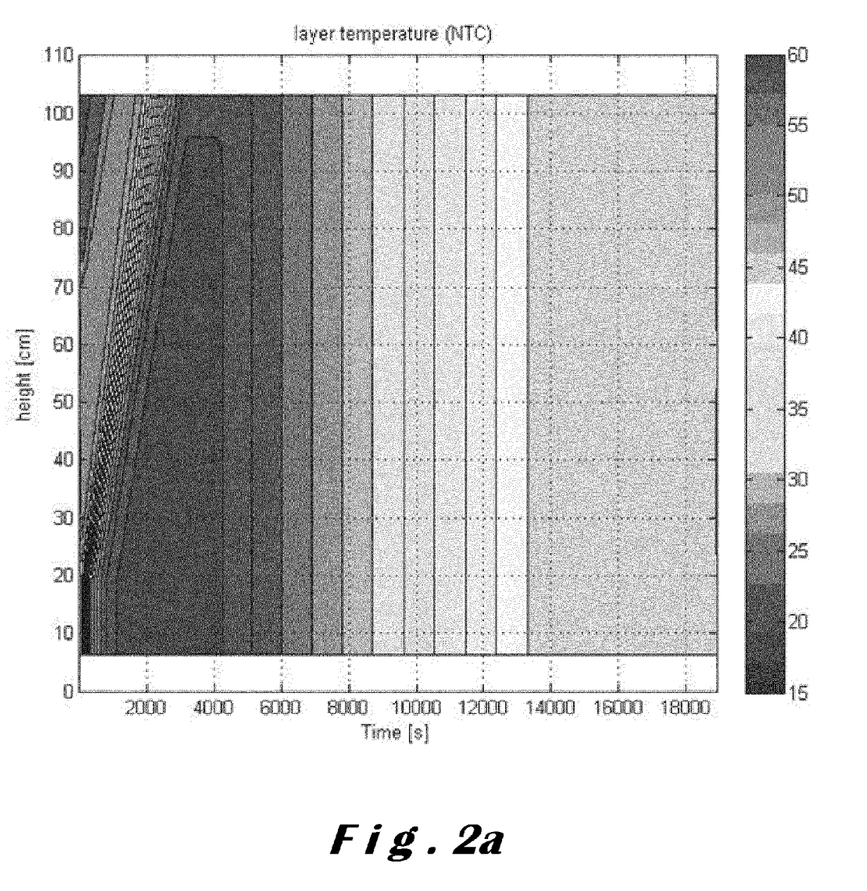
FIG. 2a shows a simulation of the temperature sensed by the different sensors along height direction of the thermal energy buffer 10, in this case a water heating unit 18, in function of time after initially using all heater water contained in the thermal energy buffer 10 and subsequently heating the newly added water which initially entered the heating unit at about 15° C.

FIG. 2a shows a simulation of the temperature sensed by the different sensors along height direction of the thermal energy buffer 10, in this case a water heating unit 18, in function of time after initially using all heater water contained in the thermal energy buffer 10 and subsequently heating the newly added water.

Figure 2B:
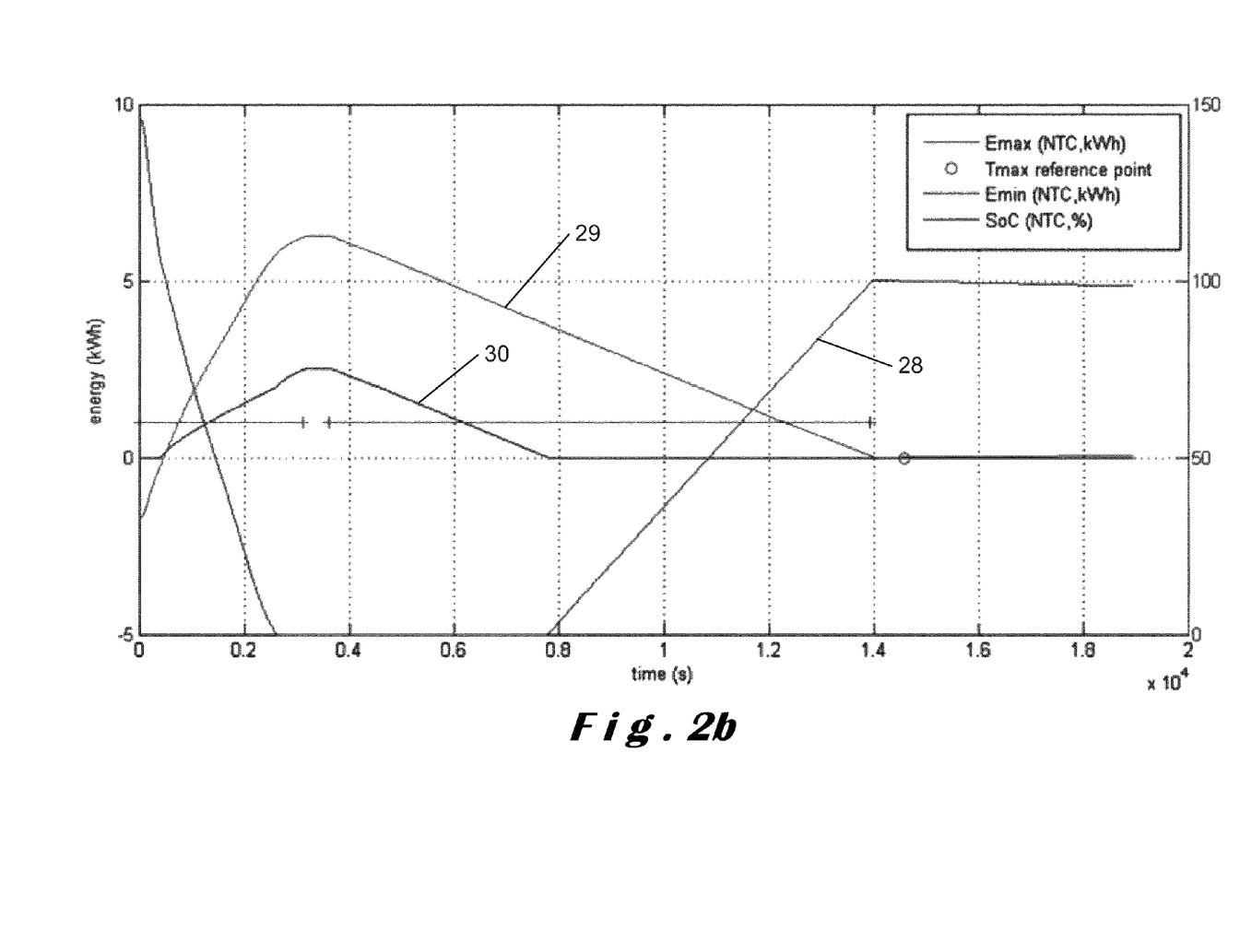
FIG. 2b shows different thermal energy values such as the state of charge 28, the $E_{max}$ 29 and the $E_{min}$ 30.

FIG. 2b shows different thermal energy values such as the state of charge 28 (%, with the scale shown at the right-hand side), the $E_{max}$ 29 (kWh) and the $E_{min}$ 30 (kWh).

Figure 3A:
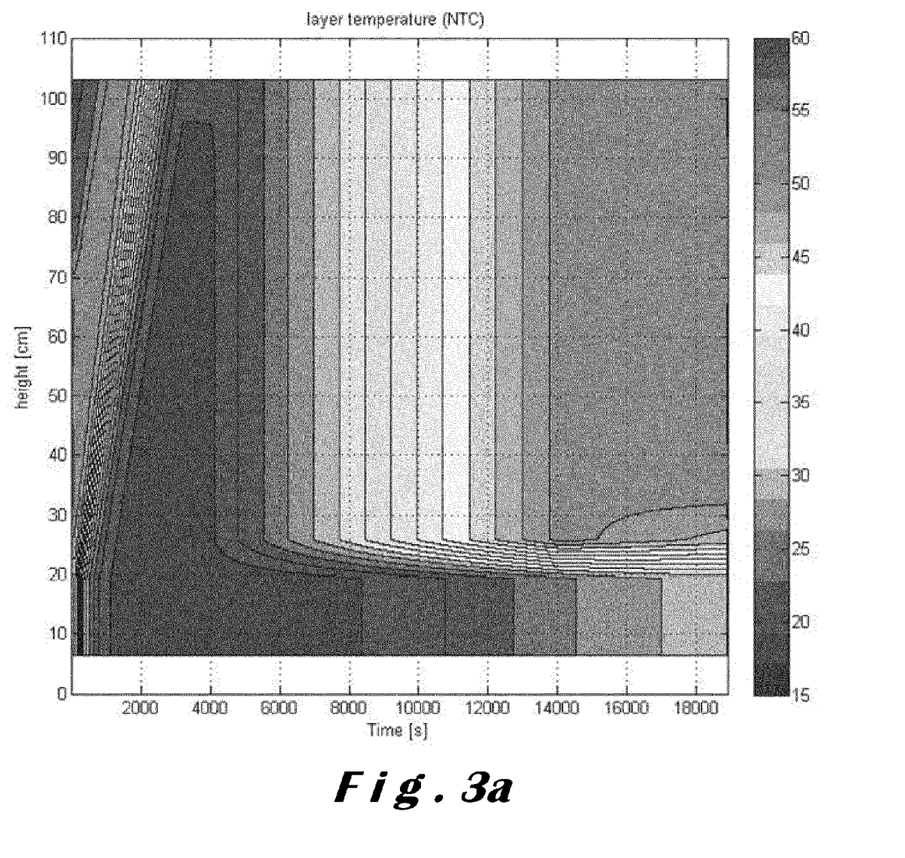
FIGS. 3a and 3b show the results of a different simulation as the one shown in FIGS. 2a and 2b.
Figure 3B:
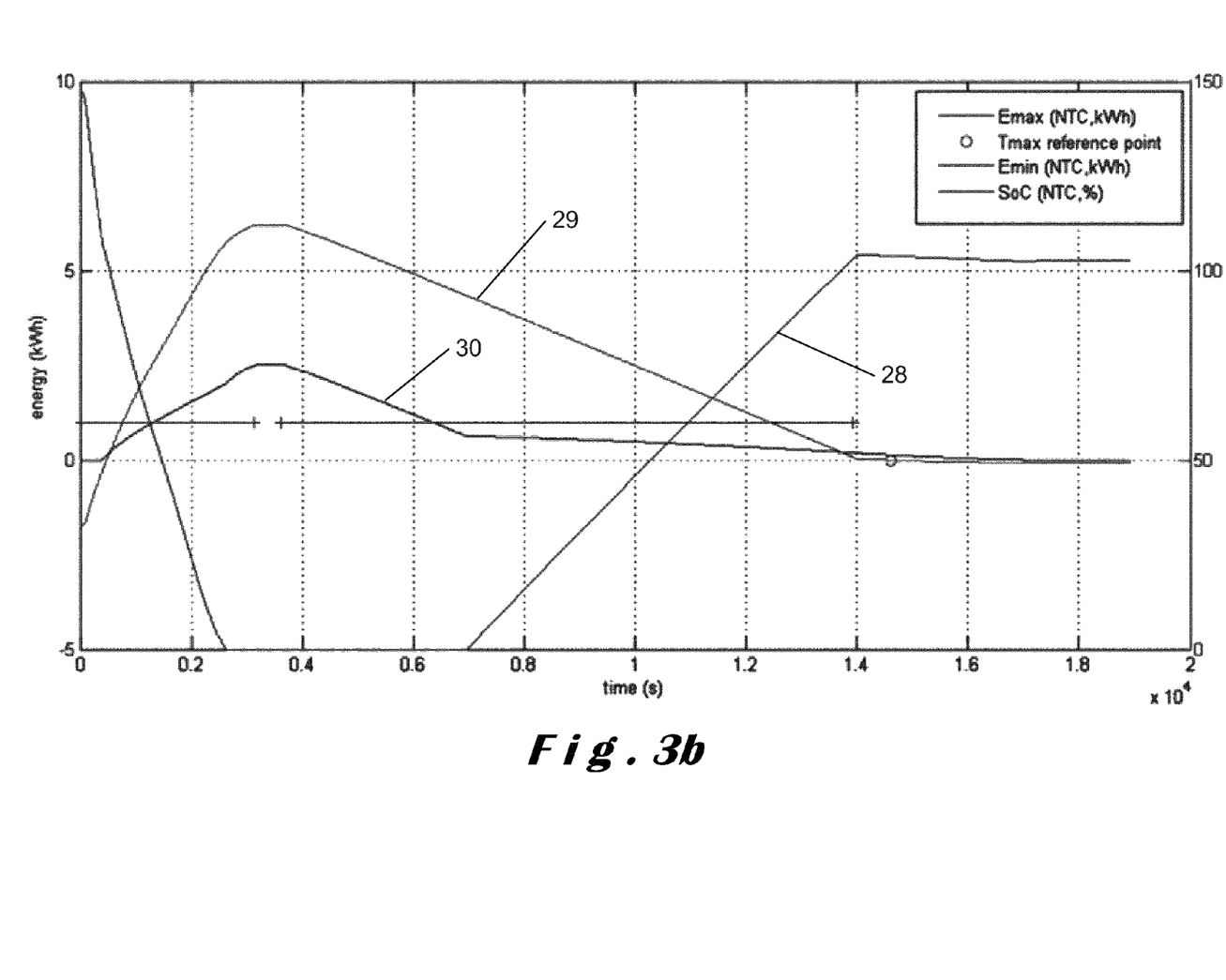

FIG. 3a shows a simulation of the temperature sensed by the different sensors along height direction of the thermal energy buffer 10, in this case a water heating unit 18, in function of time after initially using all heater water contained in the thermal energy buffer 10 and subsequently heating the newly added water. However in this simulation the heater 4 is not situated below the lowest temperature sensor and it can be observed that a distorted temperature profile is being measured making it distorting a the representation of the different thermal energy values shown in FIG. 3b such as the state of charge 28, the $E_{max}$ 29, the $E_{min}$ 30 and the measured energy.

The present invention comprises a controller for carrying out any of the methods of the present invention. In particular the controller may have a processing engine such as a microprocessor or an FPGA which is able to execute a program. This program may include software having code segments which when executed on the processing engine, are adapted to receive at least one signal representing at least one thermal energy value related to the thermal energy buffer, and to calculate an at least one thermal energy value comprising a predetermined minimum amount of thermal energy present in the thermal energy buffer and an amount of thermal energy present in the thermal energy buffer.

The software may be adapted to provide signals to control a heater of the thermal buffer in function of the thermal energy values such that the amount of thermal energy present in the thermal energy buffer is higher than or equals the predetermined minimum amount of energy present in the thermal energy buffer.

The software may also be adapted to calculate a value representing the amount of thermal energy present in the thermal energy buffer, whereby the thermal energy values comprise a minimal amount of heating energy representing the amount of energy required to, using the heater, heat all the thermal buffering medium to a predetermined minimum temperature starting from the amount of thermal energy present in the thermal energy buffer, and the thermal energy values also comprise a maximal amount of heating energy representing the amount of energy required to heat all the thermal buffering medium to a predetermined maximum temperature, using the heater, starting from the amount of thermal energy present in the thermal energy buffer.

The software may be adapted to calculate a thermal energy value that comprises the amount of thermal energy present in the thermal energy buffer by dividing the value representing the amount of thermal energy present in the thermal energy buffer with the value representing the maximum amount of thermal energy stored in the thermal energy buffer. The value is the State of Charge (SoC). In a specific embodiment, the controller calculates SOC, i.e. the amount of thermal energy present in the thermal energy buffer by dividing the value representing the amount of thermal energy present in the thermal energy buffer with the total volume of the thermal buffering medium multiplied with the difference between a predetermined minimum and maximum temperature.

For use with the software the volume of the thermal buffering medium can be subdivided in one or more different parts such that the different parts of the volume of the thermal buffering medium together form the total thermal buffering medium present in the thermal energy buffer; and the thermal energy buffer can comprise a respective temperature sensor for each part for sensing a temperature of the thermal buffering medium contained in the part. The software can be adapted to calculate a value representing the amount of thermal energy present in the thermal energy buffer by multiplying the temperature measured by the one or more sensors sensing the temperature of the one or more different parts of the thermal buffering medium with the volume of the part of thermal buffering medium such as to obtain at least one value representing the partial thermal energy contained in the at least one part by the thermal buffering medium and adding the resulting at least one partial thermal energy value to each other.

The software may be adapted to calculate the minimal amount of heating energy by multiplying the difference of the predetermined minimum temperature and the temperature measured by the one or more temperature sensors of the one or more parts containing thermal buffering medium having a temperature measured by their respective sensors which is lower than the predetermined minimum temperature with the respective volumes of the parts containing thermal buffering medium having a temperature measured by their respective sensors which is lower than the predetermined minimum temperature and adding the resulting values to each other.

The software can be adapted to calculate the maximal amount of heating energy by at least multiplying the difference of the predetermined maximum temperature and the temperature measured by the one or more temperature sensors with the respective volume of the part corresponding to the temperature sensor (and adding the resulting values to each other.

The software can be adapted to calculate the amount of thermal energy present in the thermal energy buffer by only using the parts containing thermal buffering medium having a temperature measured by their respective sensor which is higher than or equal to the predetermined minimum temperature.

The software may be compiled for a target processing engine in the controller. Alternatively the software may be written in an interpretative language such as Java and the controller may include a processor with an interpreter configured as a virtual machine.

The software may be supplied in executable form on a non-transient signal storage medium such as an optical disk (e.g. DVD- or CD-ROM), magnetic tape, magnetic disk (diskette, hard drive), solid state memory (RAM, USB memory stick, solid state drive).

The invention claimed is:

1. A method for buffering thermal energy in a thermal buffering medium contained within a thermal energy buffer having a controller and a heater, wherein at least one signal representing predetermined thermal energy values related to the thermal energy buffer is provided to the controller, the predetermined values comprising:
a predetermined maximum temperature settable by a user,
a predetermined minimum temperature, and
a predetermined minimum amount of thermal energy present in the thermal energy buffer settable by a user,
wherein the controller is configured to calculate the following thermal values:
a maximal amount of heating energy representing the amount of energy required to heat all the thermal buffering medium to the predetermined maximum temperature, using the heater, starting from the amount of thermal energy present in the thermal energy buffer,
minimal amount of heating energy representing the amount of energy required to, using the heater, heat all the thermal buffering medium to the predetermined minimum temperature starting from the amount of thermal energy present in the thermal energy buffer, and a value representing an amount of thermal energy present in the thermal energy buffer,
wherein the controller controls the heater of the thermal buffer in function of said thermal energy values such that the amount of energy present in the thermal energy buffer is higher than or equals the predetermined minimum energy present in the thermal energy buffer,
wherein the volume of the thermal buffering medium is subdivided in one or more different parts such that the one or more different parts of the volume of the thermal buffering medium together form the total thermal buffering medium present in the thermal energy buffer; and the thermal energy buffer comprises a respective temperature sensor for each of the one or more different parts for sensing a temperature of the thermal buffering medium contained in the one or more different parts,
wherein the controller calculates a value representing the amount of thermal energy present in the thermal energy buffer by multiplying the temperature measured by the one or more sensors sensing the temperature of the one or more different parts of the thermal buffering medium with the volume of the one or more different parts of thermal buffering medium such as to obtain at least one value representing a partial thermal energy contained in the one or more different parts by the thermal buffering medium and adding the resulting at least one partial thermal energy value to another value representing a partial thermal energy contained in a different part of the thermal buffering medium, if present,
wherein the controller calculates the minimal amount of heating energy by multiplying the difference between the predetermined minimum temperature and the temperature measured by the one or more temperature sensors of the one or more different parts containing thermal buffering medium having a temperature measured by their respective sensors which is lower than the predetermined minimum temperature with the respective volumes of the one or more different parts containing thermal buffering medium having a temperature measured by their respective sensors which is lower than the predetermined minimum temperature and adding the resulting values to another value representing a minimal amount of heating energy required for a different part of the thermal buffering medium, if present, and
wherein the controller calculates the maximal amount of heating energy by at least multiplying the difference of the predetermined maximum temperature and the temperature measured by the one or more temperature sensors with the respective volume of the one or more different parts corresponding to the temperature sensor and adding the resulting values to each other.

2. The method for buffering thermal energy according to claim 1, wherein the thermal energy buffer is a water heating unit of a domestic hot water system.

3. The method for buffering thermal energy according to claim 1, wherein the thermal buffering medium is water.

4. The method for buffering thermal energy according to claim 1, wherein the controller further calculates a state of charge by dividing the value representing the amount of thermal energy present in the thermal energy buffer with the value representing the maximum amount of thermal energy stored in the thermal energy buffer or the controller calculates the state of charge by dividing the value representing the amount of thermal energy present in the thermal energy buffer with the total volume of the thermal buffering medium multiplied with the difference between the predetermined minimum and maximum temperature.

5. The method for buffering thermal energy according to claim 1, wherein the controller uses the temperature measured by the one or more temperature sensors with respect to the predetermined minimum temperature.

6. The method for buffering thermal energy according to claim 1, wherein the controller further calculates the amount of thermal energy present in the thermal energy buffer by only using the one or more different parts containing thermal buffering medium having a temperature measured by their respective sensor which is higher than or equal to the predetermined minimum temperature.

7. The method for buffering thermal energy according to claim 1, wherein the one or more different parts subdividing the volume of the thermal energy medium are provided on top of each other along an upright direction forming a stack of one or more different parts.

8. The method for buffering thermal energy according to claim 1, wherein the heater is positioned below the lowest temperature sensor.

9. The method for buffering thermal energy according to claim 1, wherein wires interconnecting the different temperature sensors to the controller are guided to the outside of the thermal energy buffer at substantially the respective locations of the temperature sensors.

10. A non-transient signal storage medium storing the computer program product of claim 9.

11. A computer program product having code segments which when executed on a processing engine execute the method according to claim 1.

12. A thermal energy buffering system comprising a thermal energy buffer having a controller and a thermal buffering medium contained within the thermal energy buffer, the thermal energy buffering system comprising:
    means for providing at least one signal representing predetermined thermal energy values related to the thermal energy buffer to the controller, the thermal energy values comprising
    a predetermined maximum temperature settable by a user,
    a predetermined minimum temperature, and
    a predetermined minimum amount of thermal energy present in the thermal energy buffer settable by a user,
    wherein the controller is configured to calculate the following thermal values:
    a value representing an amount of thermal energy present in the thermal energy buffer,
    a minimal amount of heating energy representing the amount of energy required to, using the heater, heat all the thermal buffering medium to a predetermined minimum temperature starting from the amount of thermal energy present in the thermal energy buffer,
    a maximal amount of heating energy representing the amount of energy required to heat all the thermal buffering medium to a predetermined maximum temperature, using the heater, starting from the amount of thermal energy present in the thermal energy buffer,
    wherein the controller is configured to control the heater of the thermal buffer in function of said thermal energy values such that the amount of energy present in the thermal energy buffer is higher than or equals the predetermined minimum energy present in the thermal energy buffer, and
    wherein the volume of the thermal buffering medium is subdivided in one or more different parts such that the one or more different parts of the volume of the thermal buffering medium together form the total thermal buffering medium present in the thermal energy buffer; and
    the thermal energy buffer comprises a respective temperature sensor for each of the one or more different parts for sensing a temperature of the thermal buffering medium contained in the one or more different parts
    wherein the controller is adapted to calculate a value representing the amount of thermal energy present in the thermal energy buffer by multiplying the temperature measured by the one or more sensors sensing the temperature of the one or more different parts of the thermal buffering medium with the volume of the one or more different parts of thermal buffering medium such as to obtain at least one value representing a partial thermal energy contained in the one or more different parts by the thermal buffering medium and adding the resulting the at least one partial thermal energy value to another value representing a partial thermal energy contained in a different part of the thermal buffering medium, if present, wherein the controller is adapted to calculate the minimal amount of heating energy by multiplying the difference between the predetermined minimum temperature and the temperature measured by the one or more temperature sensors of the one or more different parts containing thermal buffering medium having a temperature measured by their respective sensors which is lower than the predetermined minimum temperature with the respective volumes of the one or more different parts containing thermal buffering medium having a temperature measured by their respective sensors which is lower than the predetermined minimum temperature and adding the resulting values to another value representing a minimal amount of heating energy required for a different part of the thermal buffering medium, if present, and
    the controller is adapted to calculate the maximal amount of heating energy by at least multiplying the difference between the predetermined maximum temperature and the temperature measured by the one or more temperature sensors with the respective volume of the one or more different parts corresponding to the temperature sensor and adding the resulting values to each other.

13. The system according to claim 12, wherein the thermal energy buffer is a water heating unit of a domestic hot water system.

14. The system according to claim 12, wherein the thermal buffering medium is water.

15. The system according to claim 12, wherein the controller is adapted to further calculate the state of charge by dividing the value representing the amount of thermal energy present in the thermal energy buffer with the value representing the maximum amount of thermal energy stored in the thermal energy buffer or the controller calculates the state of charge by dividing the value representing the amount of thermal energy present in the thermal energy buffer with the total volume of the thermal buffering medium multiplied with the difference between the predetermined minimum and maximum temperature.

16. The system according to claim 12, wherein the controller is adapted to use the temperature measured by the one or more temperature sensors with respect to the predetermined minimum temperature.

17. The system according to claim 12, wherein the controller is adapted to further calculate the amount of thermal energy present in the thermal energy buffer by only using the one or more parts containing thermal buffering medium having a temperature measured by their respective sensor which is higher than or equal to the predetermined minimum temperature.

18. The system according to claim 12, wherein the one or more different parts subdividing the volume of the thermal energy medium are provided on top of each other along an upright direction forming a stack of parts.

19. The system according to claim 12, wherein the heater is positioned below the lowest temperature sensor.

20. The system according to claim 12, wherein wires interconnecting the different temperature sensors to the controller are guided to the outside of the thermal energy buffer at substantially the respective locations of the temperature sensors.

* * * * *